US006948971B2

(12) United States Patent
Bartholomä et al.

(10) Patent No.: US 6,948,971 B2
(45) Date of Patent: Sep. 27, 2005

(54) CABLE CONNECTION

(75) Inventors: Mario Bartholomä, Winden (DE); Fritz Zügel, Waldkirch (DE); Volker Götz, Kenzingen (DE); Philipp Gerber, Gutach-Bleibach (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 0 days.

(21) Appl. No.: 10/501,850

(22) PCT Filed: Sep. 2, 2003

(86) PCT No.: PCT/EP03/09722

§ 371 (c)(1),
(2), (4) Date: Jul. 16, 2004

(87) PCT Pub. No.: WO2004/045028

PCT Pub. Date: May 27, 2004

(65) Prior Publication Data

US 2005/0130487 A1 Jun. 16, 2005

(30) Foreign Application Priority Data

Nov. 13, 2002 (DE) .................................... 202 17 501 U

(51) Int. Cl.$^7$ ............................................. H01R 13/58
(52) U.S. Cl. ..................................... 439/462; 174/74 R
(58) Field of Search ............................... 439/462, 428, 439/445; 174/74 R, 76, 78, 79

(56) References Cited

U.S. PATENT DOCUMENTS 5,432,301 A * 7/1995 Gehring ...................... 174/78
6,244,892 B1 * 6/2001 McCarthy ................... 439/421
6,350,955 B1 * 2/2002 Daoud ....................... 174/65 R
6,403,884 B1   6/2002 Lange ........................ 174/65 R

FOREIGN PATENT DOCUMENTS

| DE | 198 36 631 | 3/2000 |
| DE | 199 24 209 | 12/2000 |
| DE | 100 22 547 | 11/2001 |
| DE | 101 11 669 | 9/2002 |

* cited by examiner

Primary Examiner—Briggitte R. Hammond
(74) Attorney, Agent, or Firm—Volpe and Koenig, P.C.

(57) ABSTRACT

A cable connection (1) for connecting a cable (2) on a housing or a wall is provided. The cable connection includes a threaded bushing (3) in which the connection contacts (4) are arranged, and a conductor compartment (5), which in a use position, holds conductors (2a) or wires of the cable (2) to be to be connected, with the conductors coming to rest against the contacts (4) after insertion of the conductor compartment (5) into the threaded bushing (3). The connection also includes a clamping insert (7) that surrounds the cable (2) and lies axially adjacent to the conductor compartment (5), fixing the cable in an axial direction in the threaded bushing (3), and a cap nut (6) that is screwed onto the threaded bushing (3) for simultaneous radial deformation of the clamping insert (7) and fixing of the cable (2) in a final position of use. The conductor compartment (5) and the cap nut (6) are separate and can be attached to the threaded bushing (3) one after the other and a snap-in connection for axial fixing of the conductor compartment (5) is provided on the threaded bushing (3) for axially securing the conductor compartment (5) in the contact position.

14 Claims, 5 Drawing Sheets

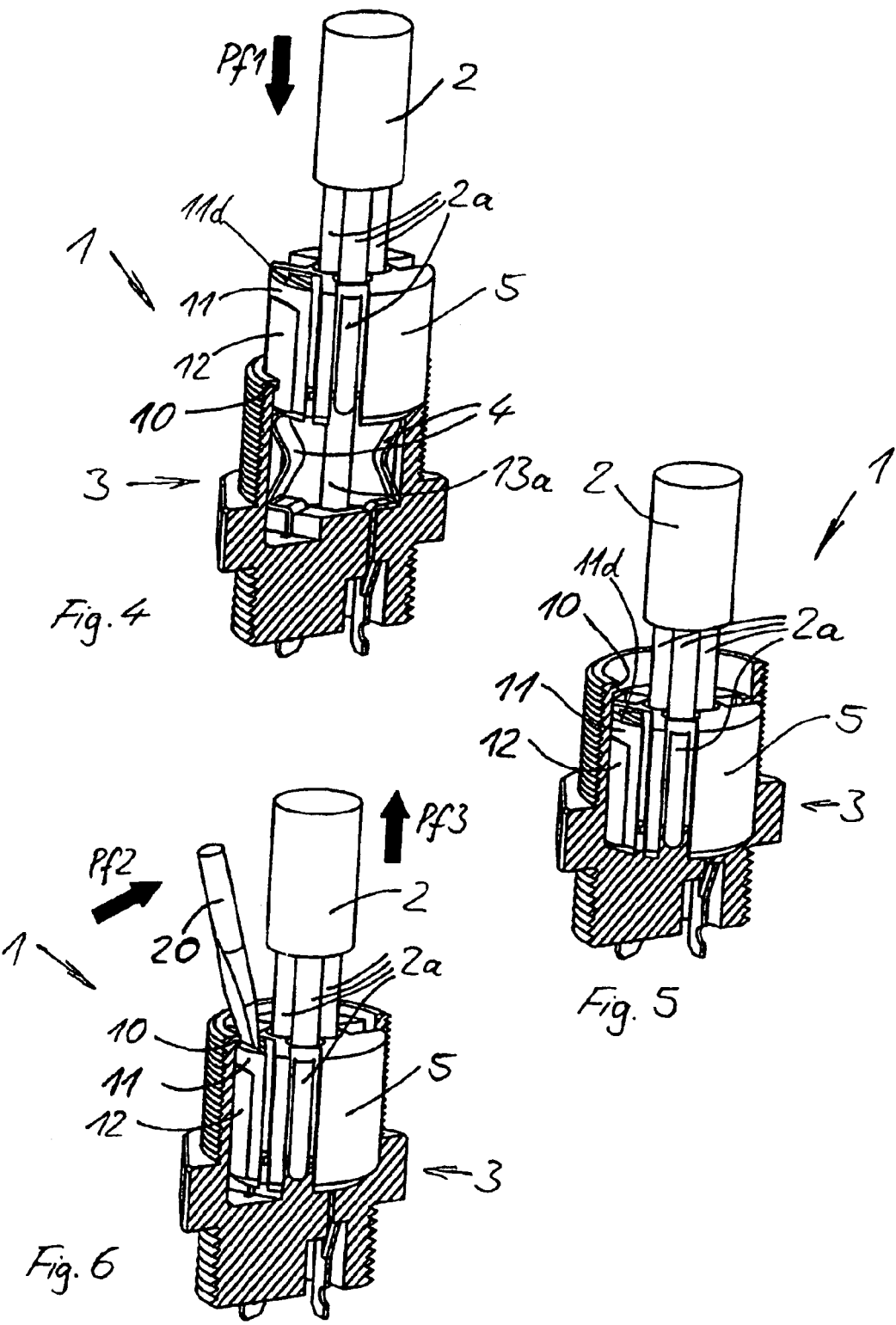

CABLE CONNECTION

BACKGROUND

The invention relates to a cable connection for a cable on a housing or a wall, in or behind which connection contacts are arranged. In its position of use, the cable is electrically connected to these contacts. The cable connection has a threaded bushing that can be mounted or screwed onto or into an opening of the housing or the wall, in which the connection contacts are arranged, a conductor compartment, in which the conductors or wires of the cable to be attached are held in the position of use and are connected to the contacts arranged there after insertion of the conductor compartment into the threaded bushing. The cable connection further includes a clamping insert that surrounds the cable axially that lies adjacent to the conductor compartment and fixes the cable in the axial direction in the threaded bushing, and a cap nut for screwing onto the threaded bushing for simultaneous radial deformation of the clamping insert and fixing of the cable in the final position of use.

Cable connections of this type are known in various forms.

For these cable connections, the contacts or the conductor compartment can be detached from its position of use until the cap nut is tightened. This means the assembly must be performed very carefully and permits practically no interruption of the assembly process, e.g., for testing whether the correct conductors or wires of the cable are touching the correct contacts before the assembly is complete.

If an assembly error is discovered after final assembly, the entire connection device must be disassembled again and corrected.

From DE 198 36 631 C2, a cable connection or attachment device is known, for which the individual wires are held in the position of use at cutting contacts and for which the conductor compartment part is fixed axially in the cap nut, such that the relative axial motion between the cap nut and connection part is also a relative axial motion between the conductor compartment part and the connection part with the tightening or loosening of the cap nut on the connection part. Through this axial fixing between the conductor compartment part and cap nut, these two parts can be mounted on the connection part practically in one working step. An assembly particularly of thicker and heavier cables on a vertical or even on an overhanging wall or ceiling from below is difficult for such an arrangement due to gravity, because when the cap nut is set on its counter thread, the cable weight must also be held by the conductor compartment. Incorrect contacts can be corrected only by complete disassembly and repetition of the difficult assembly process.

SUMMARY

Therefore, the objective is to create a cable connection of the type mentioned in the introduction, for which the assembly is simple even on vertical walls or overhead and which can be tested with sufficient certainty before the cap nut is attached to determine whether the correct conductors or wires are connected to the appropriate contacts.

To meet this objective according to the invention, the conductor compartment and the cap nut can be attached separately and one after the other to the threaded bushing and at least one snap-in connection for axial fixing of the conductor compartment in a position is provided on or in the threaded bushing. In this position, the conductors or wires are connected to the contacts. This snap-in connection enables the conductor compartment with the already arranged conductors or wires to be inserted into the threaded bushing and to be fixed in advance, so that the user no longer has to hold the conductor compartment and the attached cable for the subsequent attachment of the cap nut. In addition, the user can then test whether the correct wires are connected to the appropriate contacts before the attachment of the cap nut, i.e., before the final assembly.

Here, it is especially advantageous when one of the two axially joinable parts, namely the threaded bushing or the conductor compartment, has a projection and the other of these two axially joinable parts has a flexible, spring-like section that can snap behind the projection with a snap-in end surface, tab, recess, back-cut section, or similar counterpart. This configuration of the snap-in connection can be manufactured easily and can be applied to a wide variety of different constructions of the threaded bushing and the conductor compartment.

In a preferred embodiment, the projection belonging to the snap-in connection is arranged on the inside on the threaded bushing and the spring-like part snapping behind the projection is arranged on the conductor compartment. Here, near the inlet opening into the threaded bushing or on the inside on its edge facing the cap nut, a rib forming a back-cut section and projecting radially inwardly or a similar projection is arranged, behind which a counter projection or the end of a section of the conductor compartment spring-like in the radial direction fits and engages and snaps in the position of use. This arrangement is especially advantageous because the projection made from the stiff material of the threaded bushing has a high strength and can be deformed permanently inwards, while the spring-like section can be attached at the periphery of the conductor compartment, preferably in one piece.

The spring-like section of the conductor compartment can advantageously be separated from the conductor compartment by a slot extending along a part of the axial length of the conductor compartment and therefore simultaneously formed by this slot, wherein a closed end of the slot forms an elastic connecting piece of the spring-like section to the conductor compartment. This integral configuration of the spring-like section can be stable for a long time, because the connecting piece is minimally deformed during compression and extension of the spring and therefore material fatigue has less of an effect.

It is especially advantageous when the snap-in connection between the threaded bushing and the conductor compartment is detachable in order to be able to correct, e.g., an incorrect contact. For this purpose, it is advantageous if a pressure point for deformation of the spring-like section is arranged in its detached position on the end of the spring-like section of the conductor compartment. Therefore, e.g., for the correction of an incorrect contact or for maintenance or repair or for transport during mobile installations after removal of the cap nut, the connection between threaded bushing and conductor compartment can be separated easily and quickly, wherein the conductors remain in the conductor compartment, and for reattachment of the connection, only the conductor compartment is snapped into the threaded bushing and the cap nut must be screwed on.

To configure the detachment of the snap-in connection as easily as possible, it is advantageous if the pressure point on the spring-like section is adapted to a tool, e.g., a screwdriver, and embodied especially as a recess, preferably as a groove-like or cross-shaped slot. Thus, a special tool is not needed. Under some circumstances, other aids can also be used in such a groove-like recess for detachment.

In addition, it is advantageous when the function of the snap-in connection is combined with a positioning aid, which prevents rotation of the conductors relative to the corresponding contacts in the threaded bushing, in that, on the spring-like section, a positioning aid fitting with a counter section on the threaded bushing is provided for the correct rotational position of the conductor compartment relative to the threaded bushing. Above all, in connection with the detachable snap-in connection and the possible multiple detachment and reconnection processes between the conductor compartment and the threaded bushing, in practice this positioning aid can prevent possible incorrect connections.

In an advantageous configuration of the positioning aid, the positioning aid on the spring-like section has a cross-sectional shape that differs from a circular cross-sectional shape, e.g., it has a flattened section, which ends in the axial direction before the snap-in counter projection or before the end of the spring-like section and the profile of the projection or the rib, with which the spring-like section interacts in the sense of a snap-in connection, has a profile corresponding to the cross-sectional contours of the surface of the spring-like section, so that for the accurate rotational position, the spring-like section slides on the projection or rib perpendicular to its profile in the axial direction and fixes the resulting relative rotational position between the threaded bushing and the conductor compartment. A positioning aid embodied in this way is robust and can secure the rotational position between the threaded bushing and conductor compartment for a long time, also for repeated separation of the connection. Simultaneously, the flattened section adapted to the projection at the peripheral position of the projection simplifies the insertion of the conductor compartment and the spring-like section, thus providing a double function.

For a long service life of the positioning aid, it is likewise advantageous when the radially inner free edge of the rib is embodied at least in sections as a straight line and/or as a secant to the inner cross section of the inner opening of the threaded bushing. This matches the flattened section of the positioning aid and produces a less projecting rib, on which a non-flattened seal can also be pressed. In addition, the position of the positioning aid on the threaded bushing is easily recognizable, which can simplify the insertion of the conductor compartment into the threaded bushing.

In addition to the positioning aid, it can be advantageous if for the snapped-in position of the conductor compartment in the threaded bushing, a relative rotation between the conductor compartment and the threaded bushing is prevented by an additional rotational securing device. Thus, also in the snapped-in position, in which the snap-in rib is not in effect opposite the flattened section of the conductor compartment, a rotation of the conductor compartment relative to the contacts is prevented in the threaded bushing.

Here, an especially advantageous embodiment of such a rotational securing device is characterized in that at the periphery of the conductor compartment, a recess or a projection and in the interior of the threaded bushing a projection engaging in the recess or a recess receiving the projection are provided and in the snapped-in position they are in active connection with each other.

For protecting the contacts arranged in the threaded bushing from environmental effects, such as moisture, dust, or aggressive materials, it is advantageous if between the outer end of the conductor compartment and the bottom of the clamping insert, there is a seal, which in the position of use engages at least partially in the interior of the threaded bushing or is completely recessed into the interior and which is pressed axially onto the conductor compartment through tightening the cap nut. In this way, this seal can preferably completely surround the cable guided by the cap nut.

BRIEF DESCRIPTION OF THE DRAWINGS

In the following, embodiments of the invention are described in more detail with reference to the drawing. Shown in partially schematic views are:

FIG. 4 is a partially cut-away view of the cable connection with a conductor compartment, which is inserted only slightly into the threaded bushing, with an indication of the insertion process, FIG. 5 is a partially cut-away view of the cable connection with a conductor compartment, which is inserted completely into the threaded bushing, FIG. 6 is a view corresponding to FIG. 5 of the cable connection with a tool set on the snap-in connection for releasing the snap-in connection.

DETAILED DESCRIPTION OF THE PREFERRED EMBODIMENTS

Figure 1:
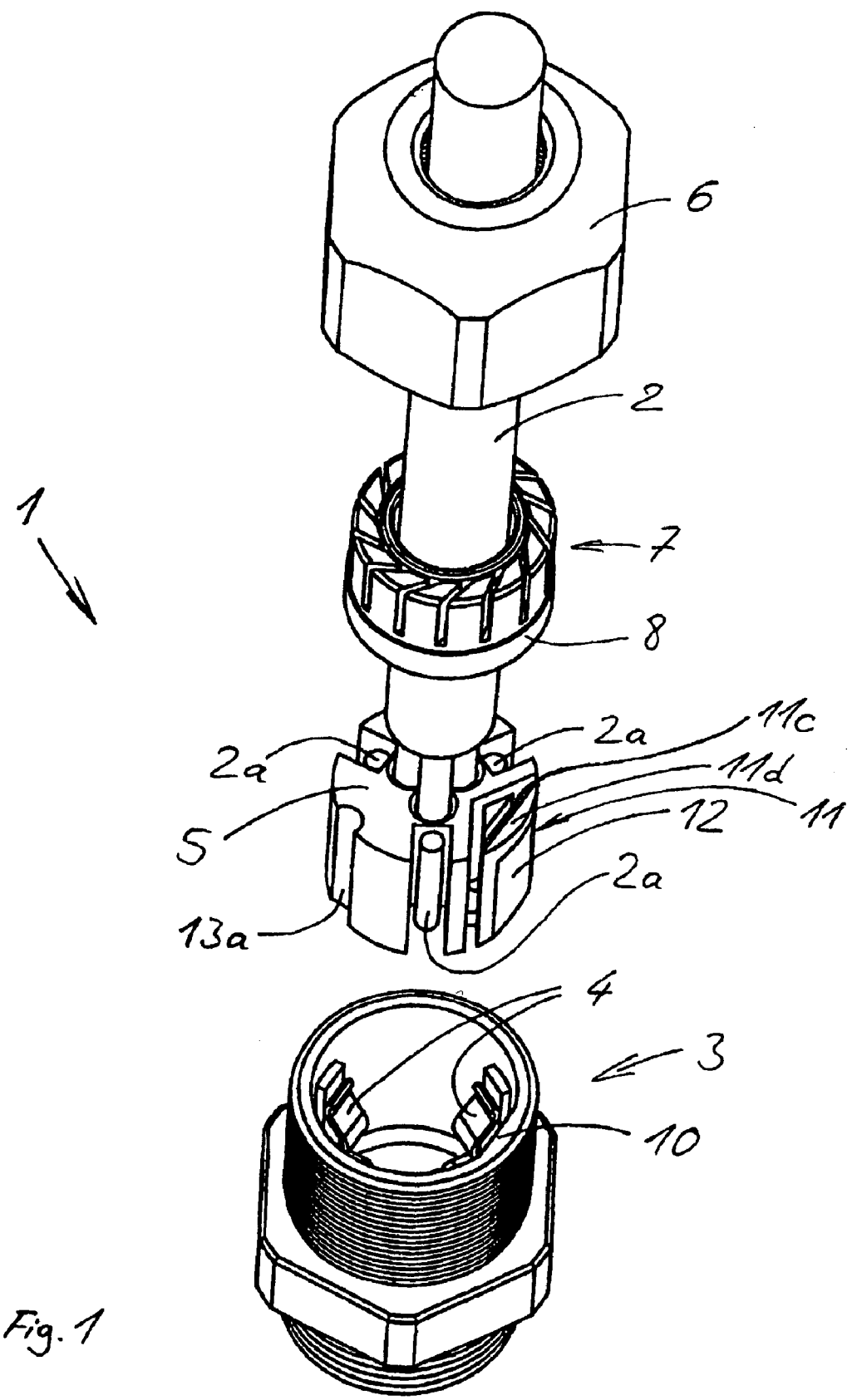
FIG. 1 is an exploded view of a cable connection according to the invention.
Figures 7, 8:
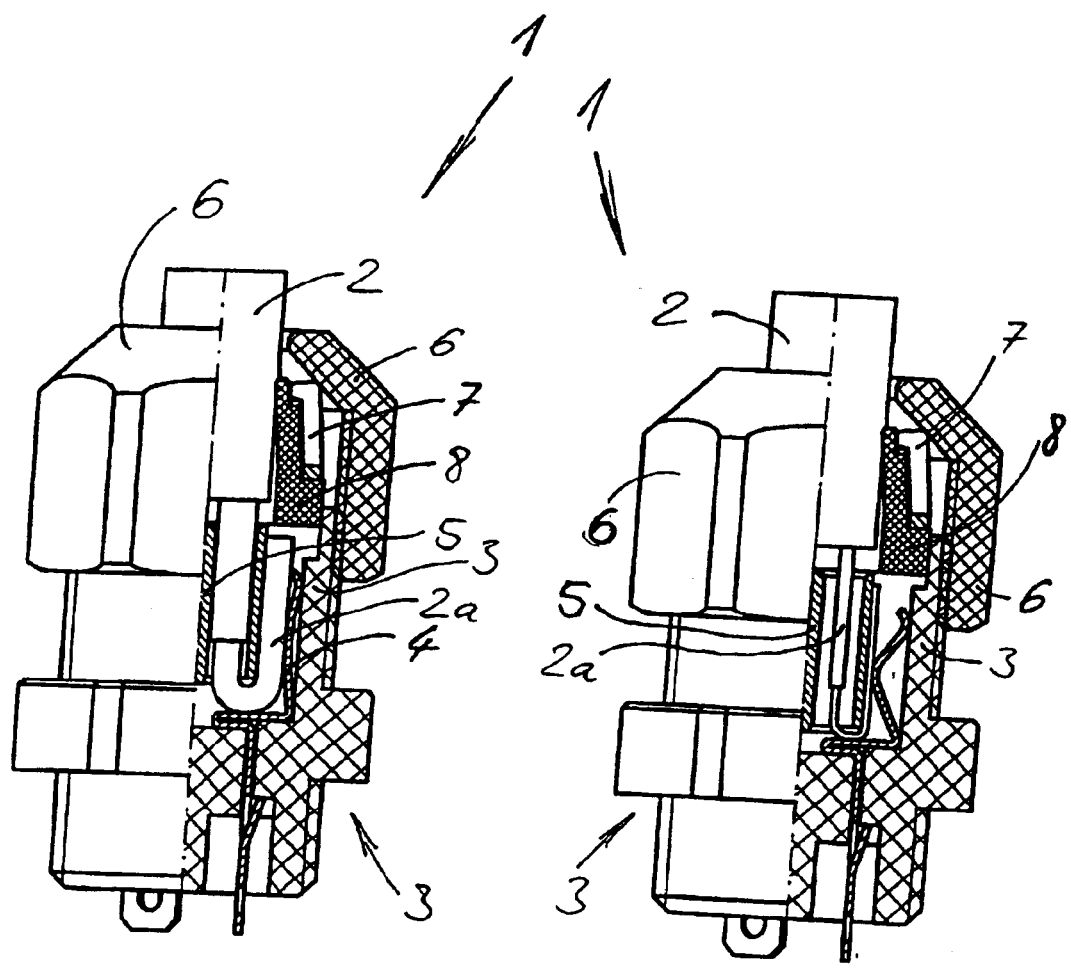
FIG. 7 is a view halfway in the longitudinal section of the cable connection completely assembled in the position of use with a cable with conductors with relatively large diameter.
FIG. 8 is a view corresponding to FIG. 7 of the cable connection with a cable with conductors with relatively small diameter.

FIG. 1 shows a cable connection designated overall with 1 in an exploded view. The cable connection 1 for a cable 2 has a threaded bushing 3, which can be attached or screwed into a housing or a wall and in which connection contacts 4 are arranged. In addition, the cable connection 1 has a conductor compartment 5 for receiving and holding the individual conductors 2a or wires of the cable 2, which are connected to the contacts 4 after insertion of the conductor compartment 5 into the threaded bushing 3 and thus produce an electrical contact. The cable connection 1 also includes a clamping insert 7, which surrounds the cable 2 axially adjacent to the conductor compartment 5 and exerts pressure on the conductor compartment 5 in the axial direction and is fixed in the threaded bushing 3 and which is deformed radially by a cap nut when the cap nut 6 is screwed onto the threaded bushing 3 and the cable 2 is fixed in the final position of use (FIGS. 7 and 8).

FIG. 1 also shows that in the threaded bushing 3, there is a snap-in connection for axial fixing of the conductor compartment 5 in a position, in which the conductors 2a or wires are in contact with the contacts 4. The snap-in connection here is formed of a projection 10 on the threaded bushing 3 and also a flexible, spring-like section 11 that snaps behind the projection 10 in the position of use.

Figure 3:
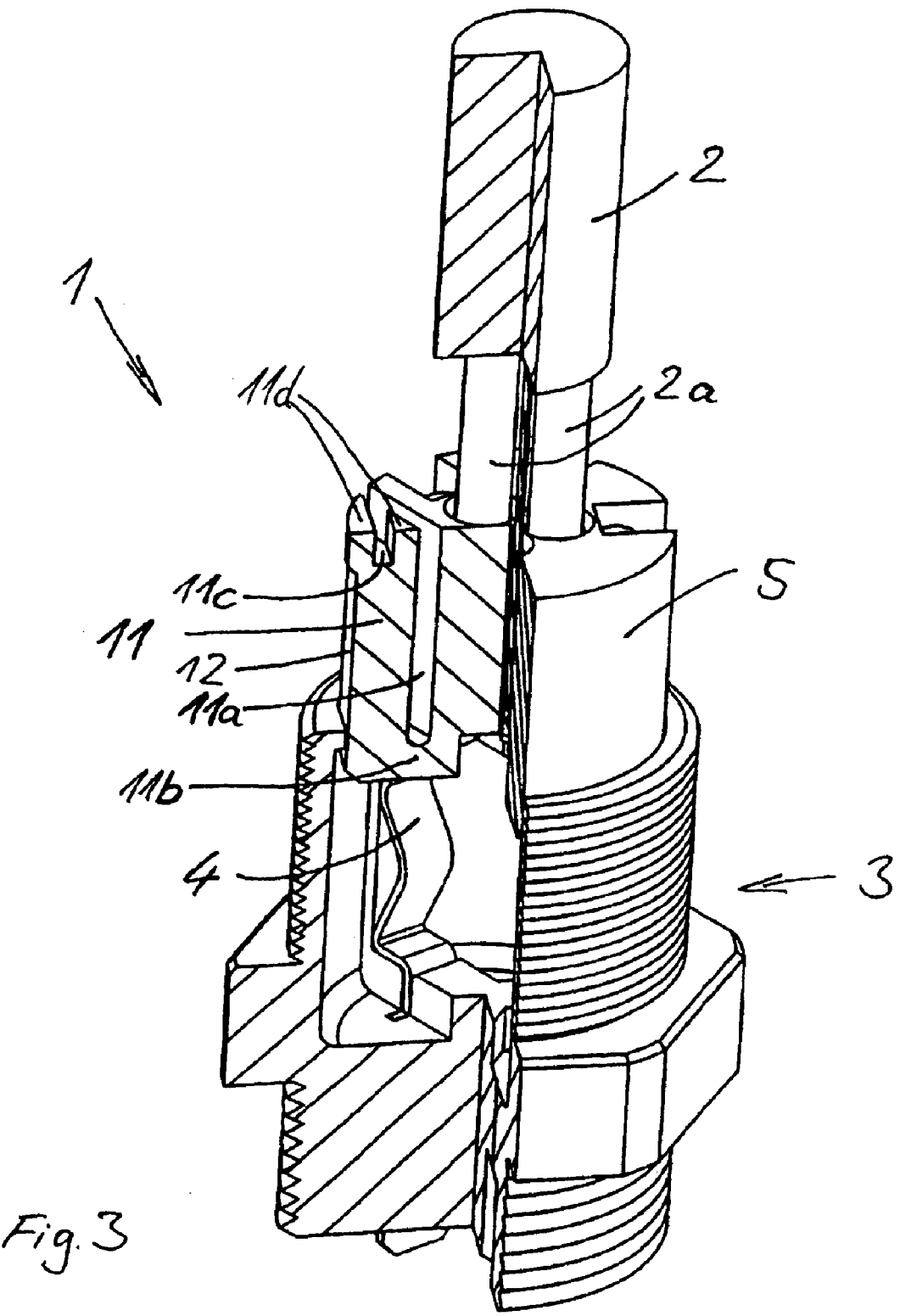
FIG. 3 is a partially cut-away view of the cable connection with a conductor compartment, which is inserted only slightly into the threaded bushing, wherein the longitudinal section extends through the region, in which the slot forming the spring-like section of the conductor compartment is arranged.

FIG. 3 shows the projection 10 extending radially inwardly and forming the back-cut section, and the spring-like section 11 once again in section, with the conductor compartment 5 being already slightly inserted into the threaded bushing 3, but is not yet locked. Likewise, it can be seen in this sectional view that the spring-like section 11 is separated and simultaneously formed from the conductor compartment 5 by a slot 11a extending along a part of the axial length of the conductor compartment 5. The closed end of the slot 11a is here formed by a spring-elastic connecting piece 11b between the conductor compartment 5 and the spring-like section 11.

FIG. 4 shows in partially cut-away view the axial insertion of the conductor compartment 5 in the direction of the arrow Pf1 into the threaded bushing 3. The position of use of the cable connection 1 with spring-like section 11 snapped in behind the projection 10 is shown in FIG. 5, and FIG. 6 shows the possible release by pivoting the snap-in connection in the direction of arrow Pf2 with the help of a tool 20 contacting a pressure point 11c on the end of the spring-like section 11 for deforming the spring-like section 11 into its release position. Here, this pressure point 11c is formed as a groove-like slot, in which a screwdriver or a similarly configured aid fits. After rotation, the conductor compartment 5 can be moved outwards in the direction of the arrow Pf3 from the threaded bushing 3.

In the section shown in FIG. 3 through the snap-in connection, it can be seen that the projection 10 can be used together with the spring-like section 11 simultaneously as a positioning aid for the conductor compartment 5 in the threaded bushing 3 in order to find the correct rotational position for connecting these two parts. Here, the positioning aid is formed by a flattened section 12, i.e., a section that is different from the circular cross-sectional shape of the conductor compartment 5 on the spring-like section 11, wherein the flattened section 12 on the projection 10, has a profile corresponding to the cross-sectional contour of the surface of the spring-like section 11 and runs in a straight line like the flattened section 12 and is configured as a secant on the inner cross section of the inner opening of the threaded bushing 3, and slides axially when the conductor compartment 5 is inserted into the threaded bushing 3. Here, the flattened section 12 ends in the axial direction before the end 11d projecting opposite it, so that this can snap behind the projection 10.

Figure 2:
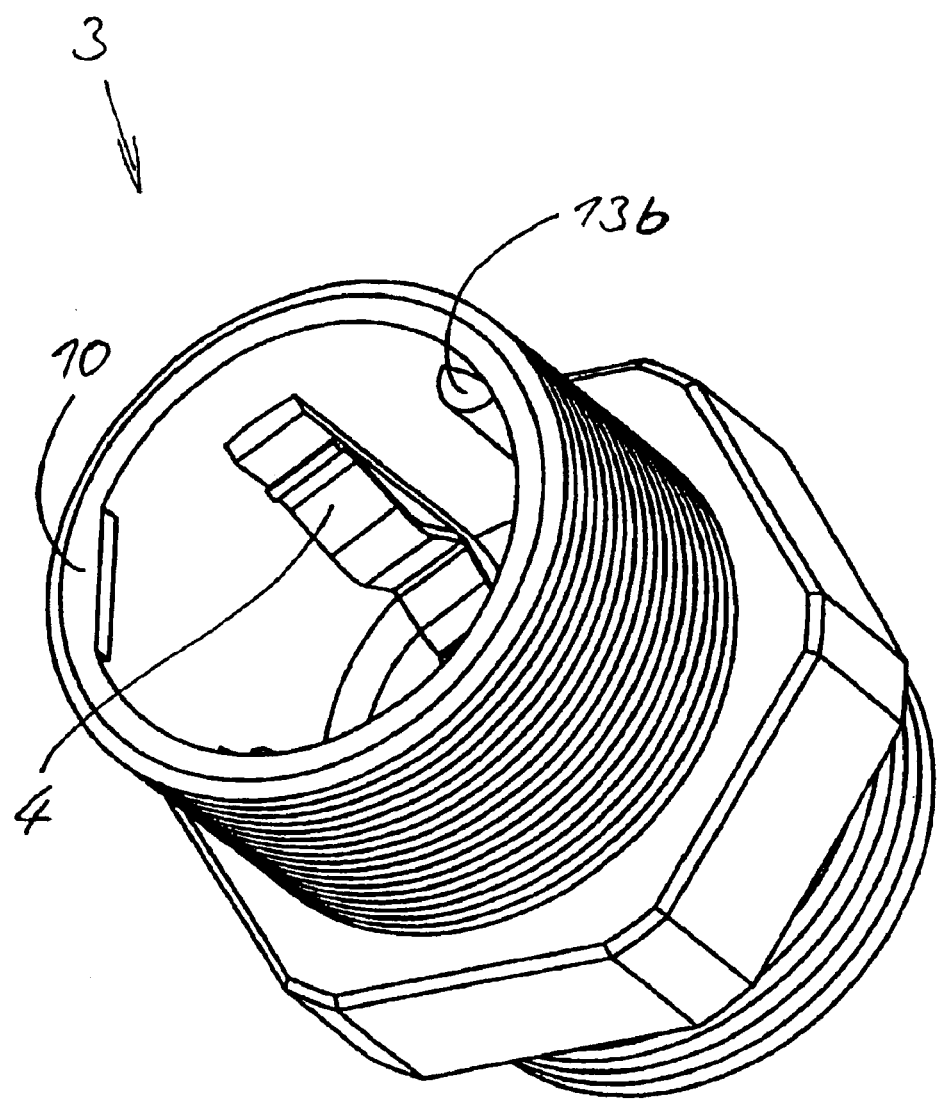
FIG. 2 is a perspective view of a threaded bushing with positioning aid and rotational securing device.

In FIGS. 1 and 2 it can be seen that for securing the snapped-in position of the conductor compartment 5 in the threaded bushing 3, i.e., in the completely assembled position of use, in which the projection 10 is not in effect opposite the flattened section 12 on the conductor compartment 5, an additional rotational securing device is provided against rotation on the cable connection 1, which is formed by a projection 13b in the interior of the threaded bushing 3 and by a recess 13a receiving this projection 13b on the conductor compartment 5 and wherein the projection 13b and the recess 13a are in active connection with each other in the snapped-in position. Here, the projection 13b runs as a connecting piece in the axial direction on the inside of the threaded bushing 3, and correspondingly, the recess 13a is formed by an axial groove on the outer periphery of the conductor compartment 5.

FIG. 1 shows that between the outer end of the conductor compartment 5 and the bottom of the clamping insert 7, there is a seal engaging in the position of use completely or partially in the interior of the threaded bushing 3, which is pressed by tightening the cap nut 6 axially onto the conductor compartment 5. The seal 8 here encloses the cable 2 on the outer periphery completely and can also be pressed onto the projection 10 based on its elasticity.

FIGS. 7 and 8 show the cable connection 1 completely assembled in the position of use, wherein in FIG. 7 a cable 2 is mounted, which has conductors 2a, which have a relatively large diameter in comparison with the openings in the conductor compartment 5. Through the U-shaped bending of the conductors 2a at the lower end of the conductor compartment 5, in this case the conductor compartment 5 cannot extend very far into the threaded bushing 3, so that the seal 8 can extend only partially into the threaded bushing 3 or can be pressed by the cap nut 6 and also the clamping insert 7.

The cable 2 assembled in FIG. 8 with thin conductors 2a relative to the openings in the conductor compartment 5 allows a deeper position of the conductor compartment 5 in the threaded bushing 3. Therefore, the seal 8 can also be pressed by the cap nut 6 and also the clamping insert 7 almost completely into the threaded bushing 3.

Above all, the combination of the previously described features produces a cable connection that is simple to assemble, that is secure against incorrect assembly, and that has a long service life.

What is claimed is:

1. Cable connection (1) for connecting a cable (2) on a housing or a wall, in or behind which connection contacts are arranged, wherein the contacts are electrically connected to the cable (2) in its position of use, comprising a threaded bushing (3), which can be mounted or screwed onto or into on or in an opening of the housing or the wall, in which the connection contacts (4) are arranged, a conductor compartment(5), which, in a use position, holds conductors (2a) or wires of the cable (2) to be connected, with the conductors (2a) or the wires coming to rest against the contacts (4) after insertion of the conductor compartment (5) into the threaded bushing (3), a clamping insert (7) surrounds the cable (2) and lies axially adjacent to the conductor compartment (5) and fixes the cable in an axial direction in the threaded bushing (3), and a cap nut (6) that is screwed onto the threaded bushing (3) for simultaneous radial deformation of the clamping insert (7) and fixing of the cable (2) in a final position of use, wherein the conductor compartment (5) and the cap nut (6) can be bought separately to the threaded bushing (3) one after the other, and on or in the threaded bushing (3) at least one snap-in connection for axial fixing of the conductor compartment (5) is provided in a position, in which the conductors (2a) or wires are connected to the contacts (4).

2. Cable connection according to claim 1, wherein the projection (10) of the snap-in connection is arranged on an inside of the threaded bushing (3) and the spring-like part (11), which snaps behind the projection (10), is arranged on the conductor compartment (5).

3. Cable connection according to claim 1, wherein the snap-in connection can be detached between the threaded bushing (3) and the conductor compartment (5).

4. Cable connection according to claim 1, wherein for the snapped-in position of the conductor compartment (5) into the threaded bushing (3), a relative rotation between conductor compartment (5) and threaded bushing (3) is prevented by an additional rotation securing device.

5. Cable connection according to claim 1, wherein on a periphery of the conductor compartment (5) a recess (13a) or a projection is provided, and in an interior of the threaded bushing a projection (13b) engaging in the recess or a recess (13a) receiving the projection is provided and are in active connection with each other in the snapped-in position.

6. Cable connection according to claim 1, wherein between an outer and side of the conductor compartment (5) and a bottom of the clamping insert (7) there is a seal (8) engaging at least partially into an interior of the threaded bushing (3) or recessed completely into the interior in the position of use, which is pressed axially onto the conductor compartment (5) by tightening the cap nut (6).

7. Cable connection according to claim 1, wherein one of the two axial joinable parts, namely the threaded bushing (3) or the conductor compartment (5), has a projection (10) and the other of the two axial joinable parts has a flexible, spring-like section (11), which snaps behind the projection (10), with a snap-in end surface (11d), tab, recess, back-cut section, or counterpart.

8. Cable connection according to claim 7, wherein a radially inner free edge (10a) of the projection (10) is formed at least in section as a straight line and/or as a secant to an inner cross section of an inner opening of the threaded bushing (3).

9. Cable connection according to claim 7, wherein near an inlet opening into the threaded bushing (3) or on an inside on an edge facing the cap nut (6) there is a rib projecting radially inwardly and that forms the projection (10), behind which the counter projection or the end side of a spring-like section (11) of the conductor compartment (5) fits in a radial direction and engages and snaps into in the position of use.

10. Cable connection according to claim 9, wherein the spring-like section (11) of the conductor compartment (5) is separated from the conductor compartment (5) and simultaneously formed by a slot (11a) extending along a portion of an axial length of the conductor compartment (5), wherein a closed end of the slot (11a) forms a spring-elastic connecting piece (11b) of the spring-like section (11) to the conductor compartment (5).

11. Cable connection according to claim 7, wherein on the end surface (11d) of the spring-like section (11) of the conductor compartment (5), a pressure point (11c) for deforming the spring-like section (11) into a released position is arranged.

12. Cable connection according to claim 11, wherein the pressure point (11c) on the spring-like section (11) is adapted to be engaged by a tool (20), e.g., to a screwdriver, and is formed especially as a recess, preferably as a groove-like or cross-shaped slot.

13. Cable connection according to claim 7, wherein on the spring-like section (11), a positioning aid matching a counter section on the threaded bushing (3) is provided for correct rotational positioning of the conductor compartment (5) relative to the threaded bushing (3).

14. Cable connection according to claim 13, wherein the positioning aid on the spring-like section (11) has a cross-sectional shape that is different from a circular cross-sectional shape, e.g., a flattened section (12), which ends in the axial direction before the snap-in counter projection or before the end side (11d) of the spring-like section (11) and the profile of the projection (10) or the rib, with which the spring-like section (11) interacts for the snap-in connection, has a profile corresponding to a cross-sectional contour of a surface of the spring-like section (11), so that for correct rotational position of the spring-like section (11) on the projection (10) or rib, it slides perpendicular to its profile, axially and fixes a relative rotational position between the threaded bushing (3) and the conductor compartment (5).

* * * * *